June 14, 1966  F. L. HOLDERREED ETAL  3,255,881
FLOTATION PROCESS CONTROL
Filed May 29, 1961  5 Sheets-Sheet 1

FIG. 1

INVENTORS
FRANCIS L. HOLDERREED
THEODORE G. FULMOR
WILLIAM LUCY
BY
ATTORNEYS

June 14, 1966     F. L. HOLDERREED ET AL     3,255,881
FLOTATION PROCESS CONTROL
Filed May 29, 1961     5 Sheets-Sheet 2

FIG. 2

INVENTORS
FRANCIS L. HOLDERREED
THEODORE G. FULMOR
WILLIAM LUCY
BY
ATTORNEYS

June 14, 1966   F. L. HOLDERREED ETAL   3,255,881
FLOTATION PROCESS CONTROL
Filed May 29, 1961   5 Sheets-Sheet 3

INVENTORS
FRANCIS L. HOLDERREED
THEODORE G. FULMOR
WILLIAM LUCY
BY
ATTORNEYS

June 14, 1966  F. L. HOLDERREED ETAL  3,255,881
FLOTATION PROCESS CONTROL
Filed May 29, 1961  5 Sheets-Sheet 4

INVENTORS
FRANCIS L. HOLDERREED
THEODORE G. FULMOR
WILLIAM LUCY
BY
ATTORNEYS

United States Patent Office 3,255,881
Patented June 14, 1966

3,255,881
FLOTATION PROCESS CONTROL
Francis L. Holderreed, Theodore G. Fulmor, and William Lucy, Anaconda, Mont., assignors to The Anaconda Company, a corporation of Montana
Filed May 29, 1961, Ser. No. 113,396
12 Claims. (Cl. 209—1)

This invention relates to a method and system for controlling a flotation process and, more particularly, the invention relates to a method, system and apparatus for assaying pulp samples from different streams in a flotation process and for making the assay information immediately available so that timely corrections can be made in the flotation process.

Owing to the nature of a flotation process, unless the mill operator has metallurgical control (in the nature of substantially instantaneous assay information) over the mineral separation in his flotation circuit, he will never be able to maintain a high percentile grade and recovery with any degree of certitude. Heretofore, the best known method of process control and the one ordinarily followed has been to cut pulp samples from the various process streams, filter the samples to reclaim the solids content, and then assay the solids by conventional wet-assay methods. The assay information determined in this manner was not available until from two to twenty-four hours after sample acquisition. The inadequacy of such a method is obvious. No amount of information gleaned in this way, even as quickly as two hours subsequent to taking the sample, can be of real value. The ore which might have been recovered if the assay information were immediately known has most likely been discharged to waste long ago. Moreover, adjusting the process according to the earlier needs of the process may prove harmful at a later time because of the many variables entering into the process, such as a refractory ore, or a natural sloughing of a circulating load which has finally exceeded the physical capacity of the circuit. Conditions such as these can cause a periodic change in the process, but after two hours these conditions are history and may no longer be representative of the present separation activity in the circuit. It is clear that these means were not adequate for meaningful control over the flotation process as the information was received too late.

We have found a new method and system of apparatus which can supply the mill operator with substantially instantaneous information of either one or several streams in the process by monitoring them continuously or sequentially. This is accomplished by utilizing a radiation assay unit of a standard type in a new and unusual arrangement. We have further found that assay information from such a system is almost immediately available so that the process can be quickly adjusted according to present conditions in the flotation circuit. Moreover, the samples used in the new system are cut directly from the desired stream in the flotation circuit, and it has been found that no better representative samples than these were attainable.

The flotation control system for analyzing the elemental content of a flotation pulp sample extracted from one of several different streams in a flotation circuit has a sampler positioned in a stream of the flotation circuit and conduit means leading from the sampler to a point remote from the flotation circuit. Pump means are joined to the circuit to propel the sample therethrough. A radiation assaying unit is connected to the conduit means and is constructed to receive the selected samples and determine the quantity of at least one element contained therein. (By "radiation assaying" we mean any of the available substantially instantaneous assaying means that have been developed in recent years, which involve exciting the sample to be assayed so that it emits (or absorbs) radiation characteristic of the element or elements to be determined, and then analyzing and measuring such emitted (or absorbed) radiation to ascertain the quantity of such element or elements that are present in the sample.) Means are also linked to the assaying unit for reading out the assay value found.

The method for controlling flotation process by analyzing the elemental content of a flotation pulp sample comprises the steps of continuously cutting a sample from at least one of the different streams in the flotation process, subjecting the sample to radiation, assaying the quantity of at least one element contained therein and adjusting the flotation process corresponding to the assay value found.

When the flotation circuit was of the type requiring several assays such as bulk tails, scavenger tails and final concentrates, all of which are final products, or the ore and bulk concentrates which are major inputs in flotation circuits, former methods were particularly inadequate. By using a radiation assaying unit and combining with it means for sequentially selecting samples from each of the above-mentioned process streams it has been found that very accurate control could be maintained over such circuits by sequentially analyzing each of the samples and quickly adjusting the flotation circuit according to the assay values thereby made available. Finally, by monitoring the various samples and co-ordinating the functions of the apparatus of the system with a programming device, it was found that the system offered particular advantages in efficiency of flotation process control never heretofore thought possible.

The flotation control system for sequentially analyzing the elemental content of flotation pulp samples extracted from several different streams in a flotation circuit has a plurality of samplers each operatively connected to a different stream in the flotation circuit for continuously cutting a sample therefrom. Conduit means lead from each sampler to a point remote from the flotation circuit. Pump means are associated with the conduits for conveying samples therethrough. Selector means, such as a selector table or a system of valves, is provided for sequentially selecting one sample at a time for analysis. A radiation assay unit is included for determining the quantity of at least one element contained therein, and means are associated with the assaying unit for reading out the assay value found.

A method for controlling flotation processes by analyzing the elemental content of a flotation pulp sample comprises the steps of continuously cutting pulp samples from several different streams in the flotation process, sequentially subjecting the samples to radiation, assaying the quantity of at least one element contained in each sample, and adjusting the flotation process as necessary corresponding to the assay values found.

One of the apparatus used in the system, in one advantageous embodiment of the invention, is the selector table. The selector table has a body into which the samples issue and positioning means thereon for holding the conduits in substantially fixed relationship thereto. A selector arm is mounted within the body and is constructed to underlie any of the conduits and remove the sample issuing therefrom. Drive means are also provided for sequentially moving the selector arm to a position underlying each of the conduits.

Another member of the control system is a de-aerator for removing entrained air from the pulp samples prior to assaying. The de-aerator has a body portion which defines a substantially enclosed chamber. Agitating means are provided within the chamber for creating turbulence of the pulp sample in the chamber. A feed conduit, an overflow conduit, and an outlet conduit all extend through the body and open into the chamber, and are positioned to permit pulp samples to be de-aerated and issue therefrom at a constant rate. In addition a drain preferably is provided for rapidly emptying the chamber.

Finally, a pulp sample cell is used in the system to present the sample passing therethrough to X-ray radiation assaying apparatus. The cell has a body member with one portion thereof constructed of a material permeable to radiation. An inlet conduit is connected to one side of the body and an outlet conduit is connected to the opposite side of the body. The body has a channel formed therein between the inlet and outlet conduits. The channel progressively expands from the conduits to a greater size in a plane substantially parallel to the portion permeable to radiation to permit a larger area of the sample to be exposed to X-rays directed substantially perpendicular to the plane, and to permit unobstructed turbulent flow of the sample therethrough.

A preferred embodiment of the invention is described hereinbelow with reference to the drawings wherein.

Figure 1:
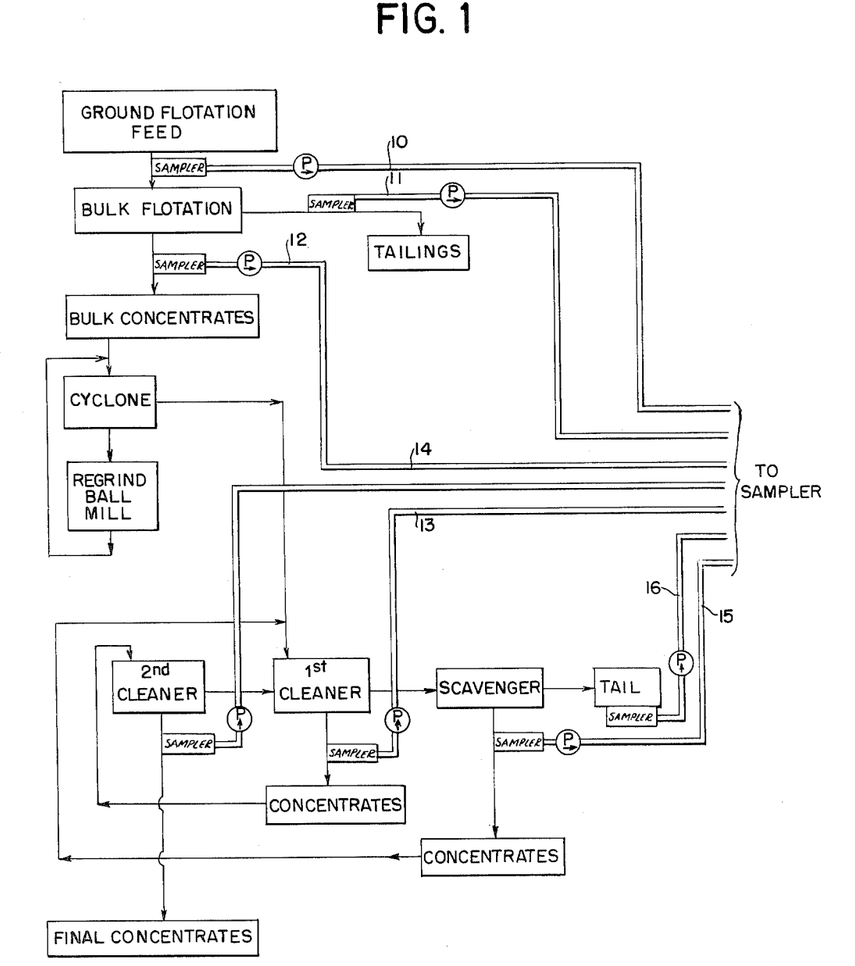
FIG. 1 is a block diagram of a typical flotation process showing samples being removed from certain streams therein.

Referring initially to FIG. 1 a typical multistage flotation circuit for the recovery of copper is represented by a flowsheet diagram. In this circuit the ore is initially submitted to a moderate primary grind and is then fed to the bulk float where the major separation of copper and gangue is made. The bulk tailing is final. After classifying in a cyclone and regrinding the bulk concentrate to further liberate copper mineral, a two-step cleaning section separates the permissible final concentrate from the middling particles. The final scavenging section is aimed at recovering only the middling copper from the previously liberated pyrite and gangue for retreatment and recycling to the cleaners. The scavenger tailing was also final.

The process set forth in the flowsheet is one in which it is desirable to cut samples from several different streams in the flotation processes and to analyze the elemental content of the pulp in these streams so that rather close control can be maintained over the entire flotation process. It is with respect to the monitoring of multiple process streams that this embodiment is to be concerned, although it is intended that the same principles and apparatus could similarly be applied to the analysis and control of a single process stream.

In the flotation process of FIG. 1 it was found desirable to cut samples from seven different type process streams; however, the number of samples which could be cut is limited only by the capacity of the particular apparatus used in the system. Samples were cut from the ore feed stream, the bulk tailing stream and the bulk concentrate stream in the first stage of the circuit and pumped through conduits 10, 11 and 12, respectively, to a point remote from the flotation apparatus. Samples were also cut from the concentrated streams of the first and second cleaners and similarly pumped through conduits 13 and 14. Samplers were also provided to cut samples from the scavenger concentrates and the scavenger tailings and pump them through conduits 15 and 16. The pumps employed can be of any suitable design and volume capacity, however, it has been found in the present example pumps having a capacity of six gallons per minute were most desirable. It is also to be noted that rubber or plastic hoses were most successfully used as the conduits throughout the system, and such hoses with quick-disconnect features to enable an operator to clean the lines in case of plugging, were found to be especially useful.

Figure 2:
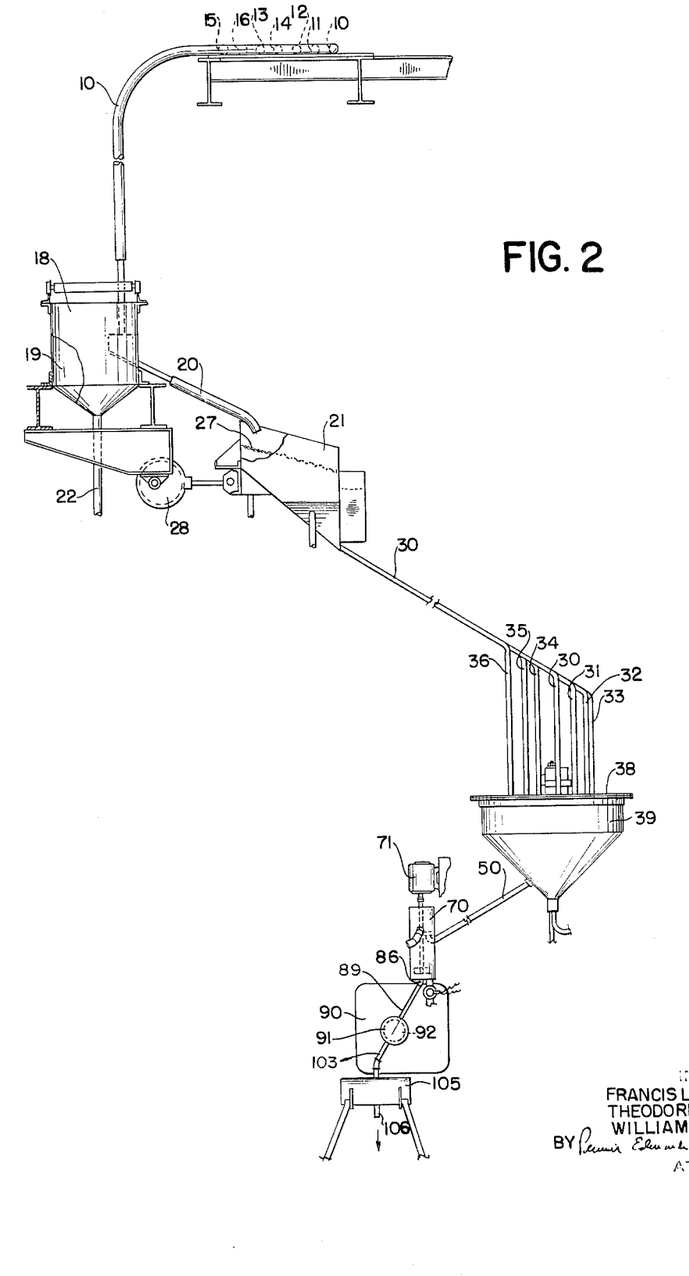
FIG. 2 is an elevation partly broken away of the apparatus of the system.

Referring now to FIG. 2, the conduits are shown aligned in a group and each terminating in one of a gang of sample cutters. As shown in the drawing, the first sample cutter 18 is partly broken away showing a second sample cutter 19. This illustrates the manner in which the sample cutters are aligned, namely, in side by side arrangement. Although it is not possible in this view to see all the sample cutters, it is sufficient to indicate the manner in which they are aligned, and that there is one sample cutter for each conduit. The purpose of these gang sample cutters is to cut the volume of the sample passing through the respective conduits so that a smaller volume, but yet a representative sample may be passed through the remaining system. The cut sample is passed through a system of outlet pipes 20 to a series of vibrating screens 21 similarly arranged as the samplers, in side by side relationship. The greatest volume of sample flowing through the samplers is not passed through the sample outlet system pipe 20; rather, it is conveyed through outlet pipe 22 at the bottom of the samplers and is transported either back to the flotation circuit or to the laboratory for chemical analysis. The vibrating screens 21 consist essentially of a screen 27 through which a sample passes to remove extraneous material and a motor 28 which is adapted to vibrate the screen rather rapidly. Any of the standard type vibrating screens could be employed for this purpose. The screened sample then passes through small rubber or plastic conduits 30-36. These conduits terminate in and are held in circular arrangement on a plate 38 overlying a selector table 39.

Figure 3:
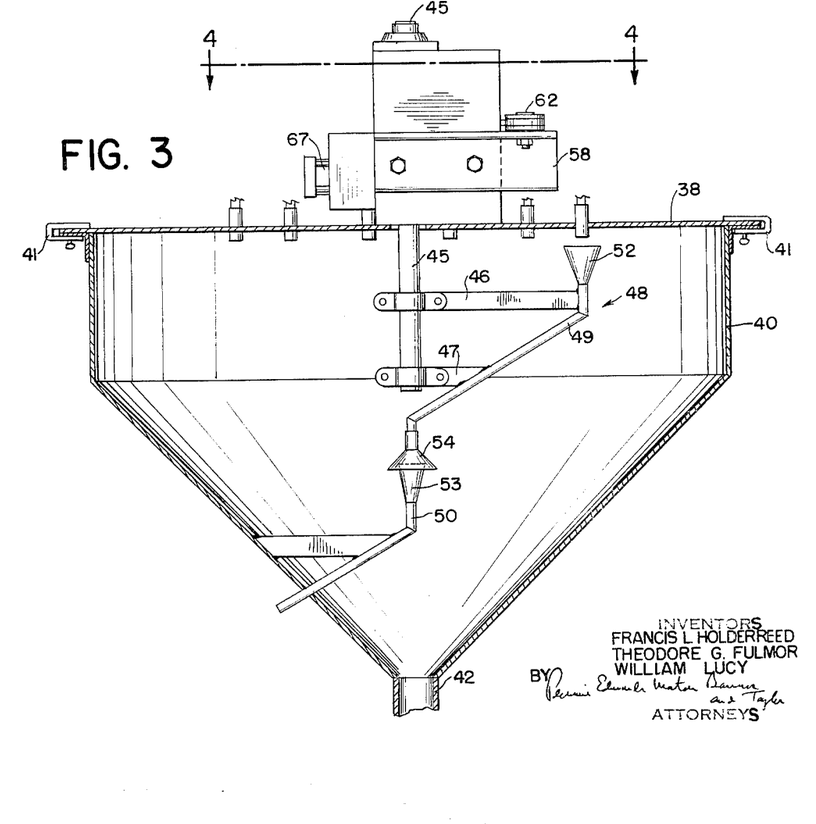
FIG. 3 is an elevation partly in section of the selector table of the system.
Figure 4:
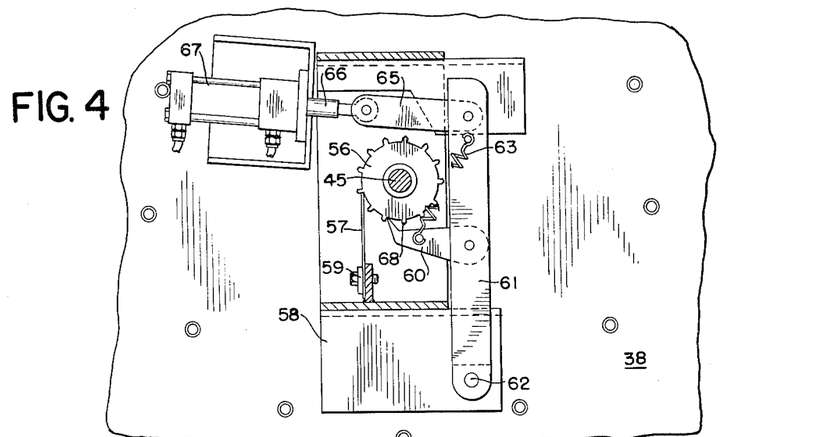
FIG. 4 is a plan view of the drive mechanism of the invention taken substantially along lines 4—4 of FIG. 3.

The selector table 39, which is one of any number of selector means which could be included in the system, is best shown with reference to FIG. 3 and FIG. 4. The plate 38 overlies the body 40 and is secured thereto by means of clamps 41. The body 40 of the selector table converges toward an outlet pipe 42 formed at the bottom portion thereof. Extending through the plate 38 substantially concentrically within the circularly arranged conduits is a drive shaft 45. Securely attached to and rotatable with the drive shaft 45 are brackets 46 and 47. The brackets 46 and 47 extend from the drive shaft in a plane substantially perpendicular to the axis of the shaft. A selector arm 48 is rigidly attached to the ends of the brackets and is rotatable therewith. The selector arm 48 consists essentially of two tubular portions 49 and 50. The first tubular portion 49 is rigidly attached to the brackets 46 and 47 and has a funnel-type receiver 52 mounted on the end thereof. The second portion 50 of the selector arm is rigidly attached to the body 40 and extends out through the body. The first and second portions 49 and 50 are coupled by inserting a flared end 53 of the second portion 50 into a wider flared end 54 of the first portion 49. By this coupling means, the end 53 substantially provides a pivot about which the first portion 49 turns as it is rotated by the shaft 45. It is well to note that flexible tubing could provide an ample substitute for the rigid tubing used as a selector arm in this embodiment.

Drive means for rotating the shaft are mounted on a portion of the plate 38 between the circularly arranged conduits. As shown in FIG. 4, rigidly attached to the end of the drive shaft 45 is a sprocket 56 which has multiple teeth extending radially therefrom. The sprocket 56 in the drawing has 13 such teeth and therefore indicates that the selector table shown has a capacity for holding 13 conduits in circular arrangement thereabout. In the present embodiment however only seven such conduits are shown. Abutting one of the teeth so as to prevent counterclockwise movement of the spindle 56 is a locking plate 57. The locking plate 57 extends tangentially from the spindle 56 and is securely mounted on a housing 58 by means of a suitable bolt and nut arrangement 59. Also abutting on a tooth is a pawl 60. The pawl 60 is pivotally mounted on an arm 61. The arm 61 is in turn pivotally mounted on the housing 58 at 62. A spring 63 is securely attached to the pawl 60 and the arm 61 such that it constantly urges the pawl against the spindle 56. Pivotally attached to the end of the arm 61 opposite to the pivotally mounted end thereof, is a linking arm 65. The linking arm 65 links the arm 61 to a piston rod 66 of an air cylinder 67 which is of the type having a double stroke and thereby is adapted to drive the piston rod 66 in either direction.

In operation, the piston rod 66 is driven out of the air cylinder 67, thereby causing the linking arm 65 and the arm 61 to correspondingly move in a direction away from the cylinder and to pivot relative to each other. This in turn causes the arm 61 to pivot at 62. The distance that the arm 61 pivots will be sufficient to cause the pawl 60 to be pulled in a counterclockwise direction over the adjacent tooth 68. Throughout the movement of the pawl 60 relative to the spindle 56, the spindle is prevented from moving counterclockwise by means of the locking plate 57. Once the pawl has been pulled over the adjacent tooth 68, the piston rod 66 is driven into the cylinder 67 in its return stroke, thereby causing the pawl 60 to be pulled in a clockwise direction relative to the spindle 56 and turn the spindle 56 and the shaft 45 an amount substantially equal to the distance between the teeth on the spindle 56. This in turn causes the selector arm 48 to be moved in stepwise direction so that the funnel-type receiver 52 will overlie each of the conduits extending through the plate 38 in stepwise fashion. Obviously, a single stroke cylinder could be employed to drive the linking arm 65 and arm 61 outwardly, and a spring connected to the arm could return it toward the cylinder after this initial cylinder stroke. By means of this selector table, samples which are constantly issuing from each of the conduits can be sequentially selected and passed through the selector arm 48 to be tested. The samples not being selected by the selector arm 48 flow out of the outlet pipe 42 to be recycled in the flotation process.

Figure 5:
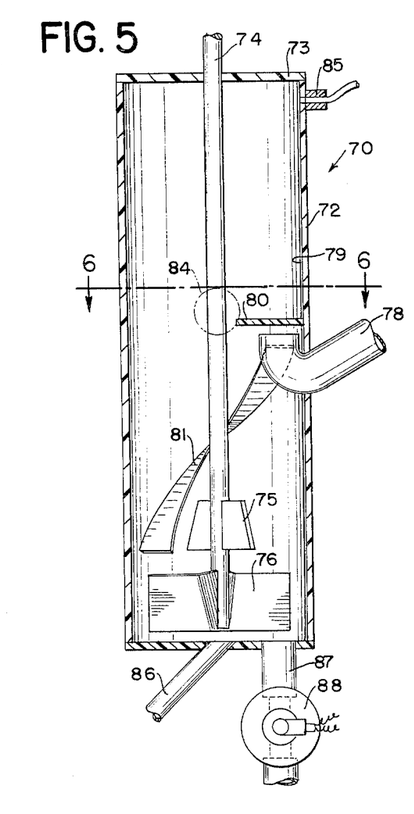
FIG. 5 is an elevation partly in section of the de-aerator of the system.
Figure 6:
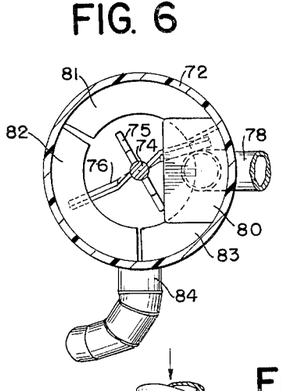
FIG. 6 is a plan view of the de-aerator taken substantially along lines 6—6 of FIG. 5.

Referring again to FIG. 2, the second portion 50 of the selector arm extends out of the selector table 39 and the selected sample is fed into a de-aerator 70. The de-aerator 70 which is driven by the overlying motor 71 is best shown with reference to FIG. 5 and FIG. 6. The de-aerator 70 has a cylindrical body 72 which substantially defines an enclosed chamber and is closed on top by a splash cover 73. Extending through the splash cover 73 into the body 72 and driven by the motor 71 is a shaft 74. Attached to the opposite end of the shaft 74 and positioned at substantially the bottom of the de-aerator are two sets of impeller blades 75 and 76. Extending through the body 72 and opening into the chamber is a substantially elbow-shaped feed conduit 78. The feed conduit 78 can be an extension of the second portion 50 of the selector arm 48 or can be a separate adapter interconnected with the selector arm 48 by means of a suitable conduit. Overlying the feed conduit 78 and securely attached to the inner wall 79 of the body 72 and extending radially inward therefrom is a deflector plate 80. The deflector plate 80 serves to randomly disperse the sample as it is fed into the de-aerator 70. Also extending radially inward and securely mounted on the inner wall 79 of the body 72 are three spiral baffles 81, 82, and 83. Only one baffle 81 is shown in the cross section of FIG. 5 but the three are illustrated in FIG. 6. These baffles tend to create sufficient turbulence to assure uniform dispersion of solids throughout the pulp, while allowing the entrained air to escape. Positioned above the feed conduit 78 is an overflow conduit 84. The exact positioning of the overflow conduit can not be seen in FIG. 5 since it extends through a portion of the wall 72 not shown in the cross section, but its relative position has been indicated by dotted lines in FIG. 5. Located above the overflow conduit 84 and extending through the wall 72 is a water jet 85 which is provided to wash any froth from the upper portion of the de-aerator. Extending out of the bottom portion of the body 72 at an angle is the outlet conduit 86. Also extending through the bottom portion of the body 72 is a relatively large diameter drain 87. The drain is provided to facilitate emptying of the chamber between samples. A solenoid operated valve 88 is provided on the drain 87 so that the de-aerator can be drained automatically upon signal.

In operation, the sample which has been selected by the selector table is fed through the feed conduit and is deflected off the blade 80 at such a rate that there is always an overflow through the overflow conduit 84. The shaft 74 is driven by the motor 71 causing the sample to be agitated by the impeller blades 75 and 76. Controlled turbulence is effected in the de-aerator by means of the spiral baffles 81, 82, 83 which deflect air bubbles toward the surface, and hence the sample is thoroughly mixed and any air entrained in the sample is removed therefrom. The de-aerated sample is passed through the outlet conduit 86 at a constant rate. This constant rate is achieved by always maintaining sufficient sample in the de-aerator to cause an overflow. The overflow can be returned to the circuit.

Referring once again to FIG. 2, as the de-aerated sample issues from the de-aerator 70 at a constant rate, it is fed through conduit 89 into an X-ray assaying unit 90 where it is analyzed by means of irradiation of the sample to determine its elemental content. X-ray assaying apparatus has been found to be especially satisfactory for rapid assaying of flotation pulps and is the preferred type of radiation assaying apparatus to use in carrying out the invention. In the X-ray assaying unit of the ordinary type the sample is irradiated by an intense X-ray beam to cause the elements in the sample to emit characteristic X-ray line spectra which are diffracted at various angles by a crystal. Elements of interest can be quantitatively determined by measuring the wave lengths and intensities of their characteristic spectral lines by counter tubes or other instruments. Although the X-ray assaying unit has proven particularly satisfactory in the system, other well-known radiation assaying means can be used in the assaying unit of the system. Included among such other radiation assaying means are (1) spectrophotometer assaying devices by which the sample is excited to emit visible light, and a photocell is used to measure the amount of light emitted by the sample at characteristic spectral lines to determine the elemental content thereof; (2) infrared spectroscopy wherein the sample is excited to emit infrared radiation and the intensity of such radiation at selected characteristic wavelengths is detected by a thermocouple or the like and converted into an electrical signal indicating the quantity of the element being determined; (3) microwave spectroscopy in which the sample is excited to emit electromagnetic radiation in the microwave region of the spectrum, and electronic means are provided for measuring the intensity of the emitted radiation at frequencies characteristic of the element being assayed; and (4) magnetic resonance spectroscopy in which the specimen is excited in an electromagnetic field and the frequency and intensity of the electromagnetic radiation emitted or absorbed by the specimen which is resonant with the applied field is measured by electronic means to determine the elemental content of the specimen.

Figure 7:
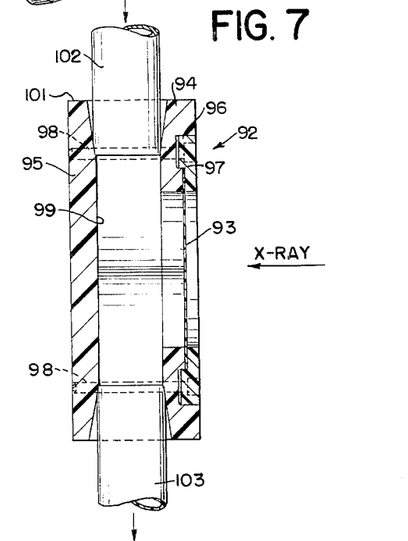
FIG. 7 is a side elevation partly in section of the pulp cell of the system.
Figures 8, 9:
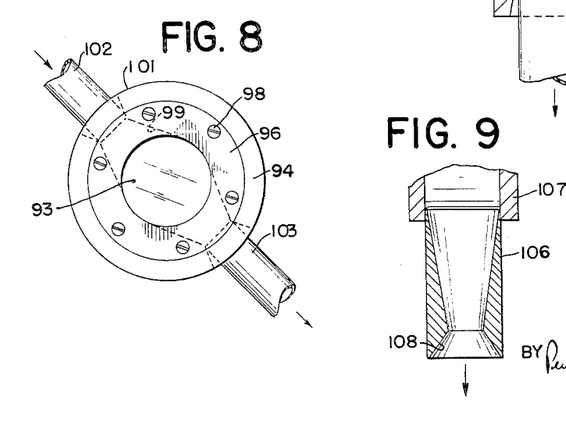
FIG. 8 is a plan view of the pulp cell.
FIG. 9 is a sectional elevation of the outlet nozzle of the system.

Included in the X-ray unit 90 is a sample station 91 which contains a specially constructed pulp sample cell 92 which is best shown in FIG. 7 and FIG. 8. The pulp sample cell 92 has a body composed of a front portion 93, a middle portion 94, and a back portion 95. The front portion 93 is essentially a thin disk preferably of polyethylene terephthalate resinous film or some other material which is permeable to X-rays. The disk 93 is stretched and tightly held on the middle portion 94 by means of an annular flanged plate 96 which is constructed to fit into an annular groove 97 formed in the middle portion. Screws 98 pass through the plate 96, middle portion 94, and back portion 95 to hold these members together as a unit. The back portion 95 is a substantially circular disk which is secured to the back of the middle portion 94 by the screws 96. The middle and back portions 94 and 95 have been made of an acrylic resinous composition, but other materials which would not be chemically attacked by the pulp would be suitable. When the portions are assembled they define a channel 99 therein. The channel 99 is formed to best confine and present a moving sample to irradiation by X-rays. The channel 99 takes a substantially flat elliptical shape in this embodiment. The channel 99 is formed in the body between an inlet conduit 102 and an outlet conduit 103 which open into the channel through opposite sides of the side wall 101 of the middle portion 94. The channel 99 progressively expands from the conduits to a greater size in a plane substantially parallel to the front portion 93. In this embodiment inlet and outlet conduits 102 and 103 are constructed within the flaring apertures in the side wall of the middle portion 94. By means of this construction, as the pulp sample is conveyed to the pulp sample cell it is forced into the cell 92 where, because of the construction of the channel 99 it is spread outwardly in a direction perpendicular to the flow of the sample and in a plane perpendicular to the direction of the X-rays to expose a larger area of the sample to radiation. Moreover because of this elliptical shape wherein the channel converges toward the conduits 102 and 103, unobstructed turbulent flow of the sample therethrough is permitted. As shown in FIG. 7, the X-rays pass through the first portion 93 in a direction perpendicular to the flow of the sample, and secondary X-rays emitting from the sample by the irradiation are analyzed according to the known methods of X-ray analysis.

Referring again to FIG. 2 the irradiated sample passes out of the X-ray analysis station 91 through conduit 103 and into a density gauge 105. This density gauge is of any of the conventional type gauges such as bubble tubes, gamma density gauges, weight devices and the like. By means of determining the density a correction can be made in the assay information gathered by X-ray analysis and a more accurate assay analysis can be made.

After density has been determined, the sample is fed from the density gauge 105 through the orifice 106 to the circuit. As shown in FIG. 9, the construction of the orifice is such that it contributes to regulating and maintaining close control over the rate of flow of the pulp sample from de-aerator 70 through the analysis equipment. The orifice converges in its internal diameter to a substantially smaller diameter than the diameter of the conduit 107 to which it is attached and then flares outwardly from the smaller diameter at its end portion 108. Hence, owing to the fact that rather close control can be maintained over the rate of flow of sample from the de-aerator 70 by designing the orifice 106 according to the rate of flow maintained above, it is possible to substantially regulate the flow of sample through the analysis system so that sample will flow with negligible head.

Figure 10:
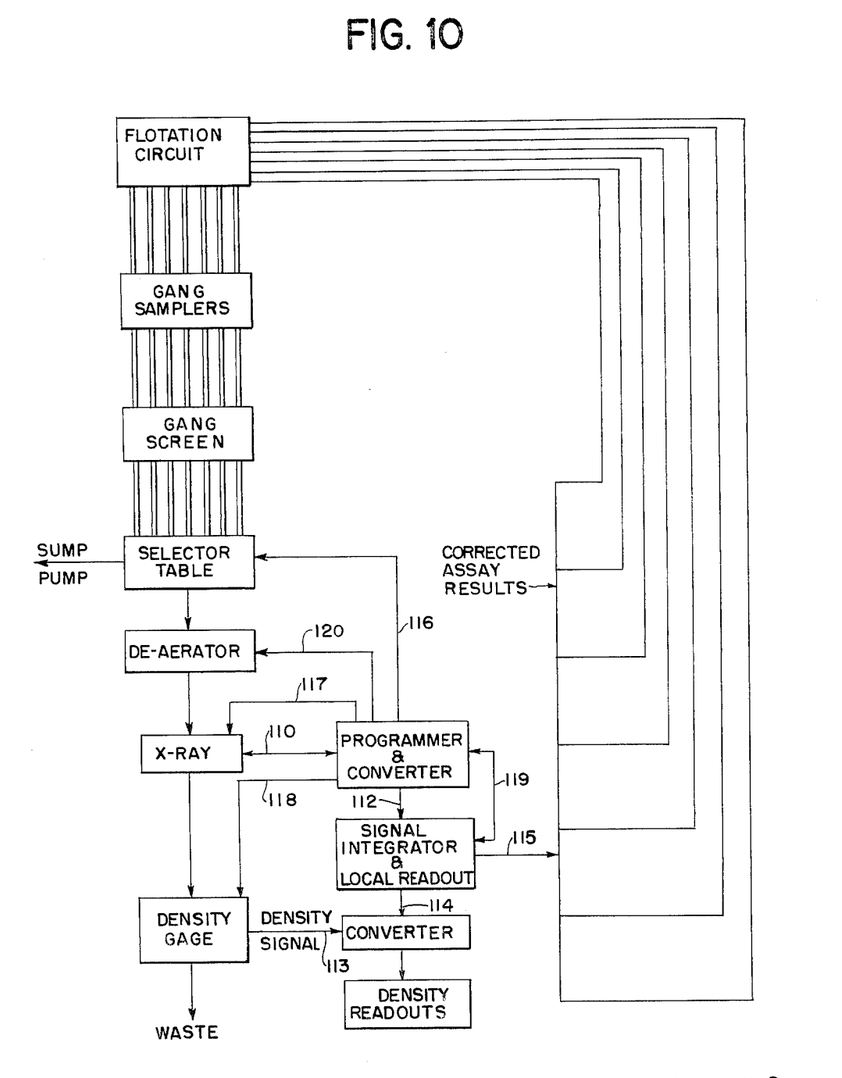
FIG. 10 is a schematic block diagram showing the functional relationship of the equipment of the system.

Referring now to FIG. 10 the entire system is set forth in a schematic block diagram. Seven pulp samples are cut from different streams in a flotation circuit and are conveyed through conduits to a series of sample cutters. The samples are individually passed through a sample cutter in the gang, where the volume of the sample is cut to a smaller representative sample and each sample is passed to a vibrating screen. The vibrating screens are provided to remove any wood fibers which may have become incorporated in the pulp sample. Wood fibers are often found in ore which is mined for example by an open pit mining process in an area where shafts were formerly sunk for underground mining. Since small tubing in the order of ¼" might subsequently be used in the system for conveying samples, any wood fibers present in the sample would surely plug the small diameter tubing and of course be detrimental to efficient operation of the entire system.

The screen samples are then passed to a selector table where one of the samples will be selected and further conveyed to be assayed. There is a continuous flow of different samples into the selector table and since only one sample is being conveyed through the remainder of the system at any given time, the bulk of the samples are passed to a sump pump where they are recycled in the flotation circuit.

One condition that must be carefully considered prior to analyzing pulp samples is the entrainment of air in the pulp samples. This entrained air in combination with flotation reagents which are contained therein, could by continued handling and physical manipulation cause a froth flotation action in the pulp sample stream and thereby result in a concentration of copper minerals into the accidental froth. This could cause widely varying assays which would not be indicative of the true solid content of the sample. Hence, a de-aerator is positioned in the system before the assaying unit, for purposes of removing the entrained air. In this system of monitoring multiple different process streams, it is often necessary especially when passing from two widely varying pulp samples (e.g. bulk tailings and final concentrates) to activate the drain valve 88 of the de-aerator 70 (see FIG. 5) and thereby initiate a dump and flush cycle in the de-aerator, pulp sample cell and density gauge equipment in preparation for the next sample signal. This flush operation could be accomplished by flushing the newly selected sample through the system for a period prior to analyzing. It has also been found that froth accumulates on the side walls of the de-aerator above the overflow conduit. Hence, water is usually sprayed into this upper portion while the drain valve 89 is open to remove any froth accumulation.

The analysis of the elemental content of the sample is accomplished in this system by means of an X-ray assaying unit, utilizing the well-known X-ray spectrographic technique. The sample is simply passed through the X-ray unit and the quantity of a single major element (e.g. copper), or multiple elements can be determined substantially instantaneously.

Ordinarily the pulp sample presented for assaying is not of a uniform pulp density. Therefore, in order to achieve a high quality assay the density must be determined and applied to the raw assay signal issuing from the X-ray device as a correction factor. Density gauges of the ordinary type can be employed for this purpose which feed out the density value in the form of a signal. The pulp sample is then recycled in the flotation circuit. Although the density gauge has been shown positioned to receive the pulp sample immediately after assaying, it would not be departing from the invention to position it between the de-aerator and the assaying unit or even upstream from the de-aerator.

The well-known theory of X-ray analysis centers around the concept that the energy intensity of a diffracted beam of secondary X-rays emitted from the pulp sample is proportional to the quantity of the element in that sample. The usual procedure followed to determine the quantity of copper in an unknown sample is to initially determine the energy read-outs of a similar known or standard sample to provide a known energy read-out for comparison with the energy read-out from the unknown sample. One factor which must be considered in making such a comparison, is to be certain that the matrix of both these samples are similar. For example, any iron present in a copper concentrator process stream would absorb the secondary radiation of copper. Thus, the energy read-out for the copper contained in the sample would be less than the energy read-out for a similar quantity of copper either in some known absorbing matrix or in pure copper alone. It is therefore necessary when making the comparisons with a known sample to be quite certain that the sample chosen has similar mineralogical matrix variations.

In practice, the assaying technique consists in matching or comparing the assay signal presently being read out, with a set of previosuly calibrated constants for the X-ray and density signal. There will, of course, be as many different groups as there are different type pump samples being tested. Typical examples of these groups are: bulk flotation tailings in a range of 0.05–0.25% copper; ore feed in a range of 0.5–1.5% copper; bulk concentrates in a range of 4–12% copper; and, final concentrates in a range of 20–35% copper.

Because both the energy and density read-outs are in the form of a signal that can easily be converted to an electrical impulse, several electronic instruments blend nicely into the control of the system. As shown in FIG. 10, the raw X-ray signal is fed to the converter through line 110 and then through line 112 into the signal integrator. The density signal is subsequently fed through line 113 into a similar convertor where it is converted into a signal compatible with the converted X-ray signal and it too is fed into the signal integrator through line 114. The analog signal integrator is adapted to read out a corrected assay signal for the element or elements in question. This corrected assay information is usually indicated on a printed chart or dial or can be fed out through line 115 and fed back through the correct one of the lines indicated, to the flotation circuit. In feeding back to the flotation circuit, the assay information can be indicated on a readout device located adjacent to the process stream in the circuit from which a sample was extracted so as to enable a mill operator to make the necessary adjustments in the process, or the signal could be adapted to excite the feed, water or reagent controls to automatically make the proper adjustments in the process.

The programmer employed in this system has proven particularly useful in monitoring the different samples and co-ordinating the functions of the members of the system. One of the essentials of the programmer is a timing mechanism which would serve as a master controller for the various equipment components. As shown, the programmer is connected to the selector table by line 116 and thereby can select the specific sample stream to be analyzed. This section can be either automatic or manual. After selecting the sample stream the programmer would also select the proper X-ray and density control channels corresponding to the matrix group in which the sample falls. This information is fed to the X-ray unit through line 117 and the density gauge through line 118. The programmer is also adapted to either manually or automatically select the proper information release by a signal through line 119 whereby the assay information from the integrator will be either indicated on a dial, graphically recorded or automatically fed back to the flotation circuit. By means of line 120 the programmer is also equipped to initiate a dump and flush cycle in the aerator in preparation for selecting and analyzing the next sample.

It is quite clear from the foregoing that by monitoring the multiple process streams sequentially only one major assaying equipment complex is required. The number of samples being sequentially monitored will of course determine the intervals between the assaying of each sample. In many cases we have discovered that intervals of from 15 to 30 minutes are not too great to prevent high level of recovery and grade of concentrates.

It is also to be noted that although this system is particularly designed for providing reliable control assays, it has been found in practice that assays can be determined with this system which are sufficiently accurate to have gained acceptability for daily metallurgical accounting. Hence, by thoughtfully applying this system to a flotation circuit, it can also be used to determine metallurgical accounting assays and thereby obviate the wet-assay chemical analysis ordinarily required.

We claim:

1. A flotation control system for analyzing the elemental content of a flotation pulp sample extracted from one of several different streams in a flotation circuit such as ore and bulk concentrates, bulk tails, scavenger tails, final concentrates and the like comprising a sampler positioned in a stream in the flotation circuit, conduit means leading from the sampler to a point remote from the flotation circuit, pump means joined to the conduit to propel the sample therethrough, a de-aerator connected to the conduit at the remote point to receive the sample and remove any entrained air therefrom, a radiation assaying unit connected to an outlet in the de-aerator to determine the quantity of at least one element present in the sample flowing from the de-aerator, a density gauge downstream from the conduit constructed to determine the density of the sample as it passes therethrough, integrating means linked to the assaying unit and density gauge for integrating the elemental and density values and reading out the corrected assay value, and programming means operatively connected to at least said radiation assaying unit, density gauge, and integrating means for monitoring said sample and co-ordinating the functions of the system to which it is connected in relation to the selected sample.

2. A flotation control system for sequentially analyzing the elemental content of flotation pulp samples extracted from several different streams in a flotation circuit such as ore and bulk concentrates, bulk tails, scavenger tails, final concentrates and the like comprising a plurality of samplers each positioned in a different stream in the flotation circuit for continuously cutting a sample therefrom, conduit means leading from each sampler to a point remote from the flotation circuit, pump means joined to the conduits to propel the samples therethrough, selector means connected to the conduits and constructed to select each of the samples in sequence, a de-aerator connected to an outlet leading from the selector means to receive the selected sample and remove any entrained air therefrom, a radiation assaying unit connected to an outlet in the de-aerator to determine the quantity of at least one element present in the sample flowing from the de-aerator, a density gauge downstream from the selector means constructed to determine the density of the sample as it passes therethrough, integrating means linked to the assaying unit and density gauge for integrating the elemental and density values and reading out the corrected assay value, and programming means operatively connected to at least said selector means, radiation assaying unit, density gauge, and integrating means for monitoring said sample and co-ordinating the functions of the system to which it is connected in relation to the selected sample.

3. A system as in claim 1, wherein signal feedback means are linked to the read-out means to automatically feed a signal representing the corrected assay value back to the flotation circuit for regulating the flotation process.

4. A flotation control system for analyzing the elemental content of a flotation pulp sample extracted from one of several different streams in a flotation circuit such as ore and bulk concentrates, bulk tails, scavenger tails, final concentrates and the like comprising a sampler positioned in a stream in the flotation circuit for continuously cutting a sample therefrom, conduit means leading from each sampler to a point remote from the flotation circuit, pump means joined to the conduit to propel the sample therethrough, a screening device connected to the conduit for screening foreign matter therefrom, a de-aerator connected to the screening device to receive the sample and remove any entrained air therefrom, an X-ray assaying unit connected to an outlet in the de-aerator to determine the quantity of at least one element present in the sample flowing from the de-aerator, a density gauge downstream from the assaying unit constructed to determine the density of the sample as it passes therethrough, integrating means linked to the assaying unit and density guage for integrating the elemental and density values and reading out the corrected assay value, and signal feed back means linked to the read-out means to automatically feed a signal representing the corrected assay value back to the flotation circuit for regulating the flotation process.

5. A flotation control system for sequentially analyzing the elemental content of flotation pulp samples extracted from several different streams in a flotation circuit such as ore and bulk concentrates, bulk tails, scavenger tails, final concentrates and the like comprising a plurality of samplers each positioned in a different stream in the flotation circuit for continuously cutting a sample therefrom, conduit means leading from each sampler to a point remote from the flotation circuit, pump means joined to the conduits to propel the samples therethrough, a gang sample cutter connected to the end of the conduits for further cutting the samples, a screening device connected to outlets from the gang sample cutter for screening foreign matter therefrom, selector means located downstream from the screening device and constructed to select each of the samples in sequence, a de-aerator connected to an outlet leading from the selector table to receive the selected sample and remove any entrained air therefrom, an X-ray assaying unit connected to an outlet in the de-aerator to determine the quantity of at least one element present in the sample flowing from the de-aerator, a density gauge downstream from the assaying unit constructed to determine the density of the samples as it passes therethrough, integrating means linked to the assaying unit and density gauge for integrating the elemental and density values and reading out the corrected assay value, and programming means operatively connected to at least said selector means, radiation assaying unit, density gauge, and integrating means for monitoring said sample and co-ordinating the functions of the system to which it is connected in relation to the selected sample.

6. A method for controlling flotation processes by analyzing the elemental content of a flotation pulp sample from one of several streams in a flotation process such as ore and bulk concentrates, bulk tails, scavenger tails, final concentrates and the like which comprises continuously cutting a pulp sample from one of said several streams in the flotation process, feeding the sample to a point remote from the flotation process, further cutting a sample from the sample already taken, screening the sample, removing any entrained air from the selected sample, thereafter regulating the flow of the de-aerated sample, subjecting the sample to X-ray radiation, assaying the quantity of at least one element contained therein, determining the density of the sample immediately after subjection to radiation, integrating the elemental and density values to give the corrected assay value of the sample, adjusting the flotation process as necessary corresponding to the assay value found, and returning the samples discharged from various steps in the method to the flotation process.

7. A method for controlling flotation processes by analyzing the elemental content of a flotation pulp sample from several streams in a flotation process such as ore and bulk concentrates, bulk tails, scavenger tails, final concentrates and the like which comprises continuously cutting pulp samples from several different streams in the flotation process, feeding the samples to a point remote from the flotation process, further cutting samples from each of the samples already taken, screening the samples, sequentially selecting one of the samples, flushing the system with the selected sample before assaying, removing any entrained air from the selected sample, thereafter regulating the flow of the de-aerated sample, subjecting the sample to X-ray radiation, assaying the quantity of at least one element contained therein, determining the density of the sample immediately after subjection to radiation integrating the elemental and density values to give the corrected assay value of the sample, adjusting the flotation process as necessary corresponding to the assay value found, and returning the samples discharged from various steps in the method to the flotation process.

8. For use in a flotation control system, apparatus for analyzing a flotation pulp sample conveyed thereto comprising a de-aerator for removing any entrained air from the pulp sample and constructed to issue the sample therefrom at a constant rate of flow, a pulp cell interconnected with the de-aerator to receive the sample for exposure to radiation, a radiation assaying unit positioned adjacent to the pulp cell to irradiate the sample as it flows through the cell, a density gauge located in the system for measuring the density of the sample assayed, and a flow control nozzle at the outlet end of the density gauge constructed to limit the rate of flow of sample therethrough and in combination with the de-aerator to substantially regulate the flow of sample through the entire apparatus.

9. For use in a flotation control system having a plurality of conduits through which pulp samples from a flotation process are continuously conveyed, a selector table comprising a body into which the samples issue, a plate overlying the body through which the conduits extend and are held in spaced substantially circular arrangement, a drive shaft extending through the plate substantially concentrically within the conduit arrangement, a tubular selector arm having a first portion rigidly attached to and rotatable within the shaft and a second portion rigidly secured to the body and extending out of the body, said second portion substantially providing a pivot about which the first portion turns, a funnel-type receiver mounted on the first portion to underlie any of the conduits and guide the sample therefrom into the tubular selector arm, and drive means for rotating the shaft and the first portion to sequentially underlie each of the conduits in a stepwise fashion.

10. A flotation control system for analyzing the elemental content of a flotation pulp sample extracted from several different streams in a flotation circuit such as ore and bulk concentrates, bulk tails, scavenger tails, final concentrates and the like comprising a plurality of samplers each positioned in a different stream in the flotation circuit for continuously cutting a sample therefrom, conduit means leading from each sampler to a point remote from the flotation circuit, pump means joined to the conduits to propel the samples therethrough, a selector table operatively associated with the conduits and having a body into which the samples issue, positioning means on the body to hold the conduits in substantially fixed relationship thereto, a selector arm mounted within the body and constructed to underlie any of the conduits and remove the sample issuing therefrom, and drive means for sequentially moving the selector arm to a position underlying each of the conduits, a radiation assaying unit positioned to receive the selected samples from the selector table and determine the quantity of at least one element contained therein, and means linked to the assaying unit for reading out the assay value found.

11. A flotation control system for analyzing the elemental content of a flotation pulp sample extracted from one of several different streams in a flotation circuit such as ore and bulk concentrates, bulk tails, scavenger tails, final concentrates and the like comprising a sampler in a stream in the flotation circuit, conduit means leading from the sampler to a point remote from the flotation circuit, pump means joined to the conduit to propel the sample therethrough, a de-aerator for removing entrained air from the pulp sample prior to assaying and having a body portion defining a substantially enclosed chamber, agitating means within the chamber for creating turbulence of the pulp sample in the chamber, a feed conduit, an overflow conduit, and an outlet conduit all extending through the body and opening into the chamber and positioned to permit pulp samples to be de-aerated and issue therefrom at a constant rate, an X-ray radiation assaying unit connected to an outlet in the de-aerator to determine the quantity of at least one element present in the sample flowing from the de-aerator, means linked to the assaying unit for reading out the assay value found, and signal feedback means linked to the read out means to automatically feed a signal representing said assay value back to the flotation circuit for regulating the flotation process.

12. For use in a flotation control system in which pulp samples are continuously fed to an assaying unit, a de-aerator for removing entrained air from the pulp samples comprising a substantially cylindrical body portion defining a substantially enclosed chamber, agitating means within the chamber for creating turbulence in the pulp sample, spiral baffles secured to the inside of the body portion and extending into the chamber to promote de-aeration, a feed conduit, a deflector plate overlying the feed conduit, an overflow conduit, a water jet positioned above the overflow conduit, and an outlet conduit all extending through the body and opening into the chamber, said feed conduit positioned above said outlet conduit and below said overflow conduit to permit pulp samples to be fed into the chamber at a rate exceeding the rate at which they are to issue and thereby allowing the size of the outlet conduit to control the constant rate at which the de-aerated sample is to issue therefrom, and a drain in the lower portion of the de-aerator to facilitate emptying of the chamber between samples.

References Cited by the Examiner

UNITED STATES PATENTS

| | | | |
|---|---|---|---|
| 1,197,980 | 9/1916 | Wattson | 73—434 |
| 1,389,101 | 8/1921 | Ohrvall | 55—199 |
| 1,426,076 | 8/1922 | Hickman | 55—203 |
| 1,758,552 | 5/1930 | Allen | 137—625.11 |
| 1,993,944 | 3/1935 | Peebles | 55—199 |
| 2,145,903 | 2/1939 | Tinsley | 73—434 |
| 2,216,939 | 10/1940 | Dodge | 55—205 |
| 2,571,503 | 10/1951 | Underwood | 55—203 |
| 2,665,585 | 1/1954 | Marcell | 141—130 |
| 2,737,591 | 3/1956 | Wright | 250—43.5 |
| 2,741,265 | 4/1956 | Poor | 137—625.11 |
| 2,791,698 | 5/1957 | Dyroff et al. | 250—43.5 |
| 2,792,501 | 5/1957 | Barton | 250—43.5 |
| 2,817,691 | 12/1957 | Hutchins | 250—43.5 |
| 2,819,402 | 1/1958 | Watson et al. | 250—43.5 |
| 2,860,250 | 11/1958 | Pouppirt | 250—43.5 |
| 2,884,006 | 4/1959 | Hoback | 137—625.11 |
| 2,979,451 | 4/1961 | Pettinger | 137—625.11 |
| 3,021,427 | 2/1962 | Bayly | 250—43.5 |
| 3,044,236 | 7/1962 | Bearden | 55—204 |

FOREIGN PATENTS

| | | |
|---|---|---|
| 1,210,048 | 9/1959 | France. |
| 720,189 | 12/1954 | Great Britain. |
| 819,868 | 9/1959 | Great Britain. |
| 939,965 | 10/1963 | Great Britain. |

OTHER REFERENCES

Twentieth Annual Mining Symposium, Jan. 13 and 14, 1959, Univ. of Minn. (School of Mines and Metallurgy) pp. 15–28.

Mining Congress Journal, vol. 46, June 1960, pp. 82–86 and 103.

FRANK W. LUTTER, *Primary Examiner.*

HARRY B. THORNTON, HERBERT L. MARTIN, *Examiners.*

EDWARD J. MICHAEL, R. HALPER, *Assistant Examiners.*